(12) United States Patent
Ackerman et al.

(10) Patent No.: US 12,151,601 B2
(45) Date of Patent: Nov. 26, 2024

(54) PROPORTIONAL CONTROL OF VEHICLE-MOUNTED LIFTING ARMS USING ELECTRONIC SERVOMECHANISM-OPERATED HYDRAULIC VALVES

(71) Applicant: Triple C Manufacturing, Inc., Sabetha, KS (US)

(72) Inventors: Galen R. Ackerman, Sabetha, KS (US); Brody D. Weinmann, Falls City, NE (US)

(73) Assignee: Triple C Manufacturing, Inc., Sabetha, KS (US)

( * ) Notice: Subject to any disclaimer, the term of this patent is extended or adjusted under 35 U.S.C. 154(b) by 804 days.

(21) Appl. No.: 17/249,790

(22) Filed: Mar. 12, 2021

(65) Prior Publication Data

US 2021/0300227 A1     Sep. 30, 2021

Related U.S. Application Data

(60) Provisional application No. 63/002,523, filed on Mar. 31, 2020.

(51) Int. Cl.
*B60P 1/44*     (2006.01)

(52) U.S. Cl.
CPC ................. *B60P 1/4471* (2013.01)

(58) Field of Classification Search
CPC ............ B50P 1/4471; B50P 1/483; B50P 1/48
USPC .......................................................... 60/433
See application file for complete search history.

(56) References Cited

U.S. PATENT DOCUMENTS

| 6,354,184 | B1 * | 3/2002 | Hansen ............... F15B 13/0402 |
| | | | 91/418 |
| 11,339,772 | B2 * | 5/2022 | King ...................... F04B 17/03 |
| 11,828,040 | B2 * | 11/2023 | Brabec .................. E02F 9/2033 |
| 2002/0087244 | A1 | 7/2002 | Dix et al. |
| 2015/0100210 | A1 | 4/2015 | Hoock |
| 2015/0158692 | A1 | 6/2015 | Reynolds et al. |
| 2016/0002017 | A1 | 1/2016 | Ueda et al. |
| 2018/0245306 | A1 | 8/2018 | Lewis |
| 2020/0087126 | A1 | 3/2020 | Perlstein |

FOREIGN PATENT DOCUMENTS

WO     2019204275 A1    10/2019

* cited by examiner

*Primary Examiner* — Kenneth Bomberg
*Assistant Examiner* — Daniel S Collins
(74) *Attorney, Agent, or Firm* — Coughlin Law Office LLC; Daniel J. Coughlin; Stuart M. Aller (57) ABSTRACT

A controller for electronically controlling hydraulically operated lifting arms. The controller allows a wide range of quicker movement and slower movement of the lifting arms under proportional control by the operator. An electronic servomechanism is mechanically coupled to a hydraulic valve handle to control the operation of the lifting arms. The servomechanism turns a shaft in response to a proportional controller. The valve handle controls the hydraulic valve stem, allowing the hydraulically operated lifting arms to raise, lower, grip, release, and perform auxiliary hydraulic operations.

21 Claims, 9 Drawing Sheets

PROPORTIONAL CONTROL OF VEHICLE-MOUNTED LIFTING ARMS USING ELECTRONIC SERVOMECHANISM-OPERATED HYDRAULIC VALVES

CROSS REFERENCES

This application claims the benefit of U.S. Provisional Application No. 63/002,523, filed on 31 Mar. 2020.

FIELD OF THE INVENTION

The present disclosure relates to a vehicle-mounted, hydraulic-operated lifting arm apparatus for handling, loading or unrolling round bales and other loads, and more specifically for controlling the lifting arm apparatus using electronic servomechanism-operated proportional hydraulic valves.

BACKGROUND

Self-loading bed assemblies for flat-bed trucks comprising vehicle-mounted, hydraulic-operated lifting arms are useful for adapting a truck to pick-up, transport, and then feed or off-load one or more big round bales, as shown in U.S. Pat. No. 4,564,325, and manipulate and haul other loads such as reels of fiber optic cable, as shown in U.S. patent application Ser. No. 15/939,498.

The actuating mechanism for the lifting arms may be located underneath the bed. The lift arms are designed to pivot between a stored position where the arms are positioned on the top surface of the bed and an extended position for loading and unloading the cargo that is positioned on the ground.

The lifting-arms are pivotally mounted to a rear portion of the bed. The lifting arms may be mounted to supporting cross bar. The cross bar is pivotally coupled to the rear edge of the vehicle flat bed, and the cross bar and gripping arms are shiftable from a stowed position to an operating position by rotating about a transverse axis across the rear end of bed. In the operating position, the lifting arms extend outwardly from the vehicle in bale gripping alignment.

The lifting arms are commonly hydraulically operated. A first hydraulic circuit controls rotation of the lifting arms about a transverse axis across the rear end of bed for loading and unloading. A second hydraulic circuit controls movement of the first lifting arm and a second lifting arm toward and away from one another for gripping and releasing of the lifting arms. Additional hydraulic circuits may be provided to operate additional features, such as a driven wheel configured to wind cable about a reel.

Existing remote-controlled self-loading bed assemblies are binary, on-off devices. To provide safe operation of digital remote-controlled units, the remote-control operated lifting arms are often operated at a slower fixed speed due to an additional orifice component in the hydraulic circuit that restricts the hydraulic flow.

SUMMARY

We disclose a controller for electronically controlling hydraulically operated lifting arms using a controller to allow a range of quicker movement and slower movement of the lifting arms under proportional control by the operator. A mechanical linkage couples an electronic servomechanism to a hydraulic spool valve to control the operation of the lifting arms. The servomechanism turns a shaft in response to a proportional controller. The mechanical linkage controls the hydraulic valve spool, allowing the hydraulically operated lifting arms to raise, lower, grip, release, and perform auxiliary hydraulic operations.

The servomechanism can be operated with a physical control device, a joystick for example, communicating through a signal-generating encoder control unit. When the user moves the joystick in one or more axes, the control unit generates a control signal proportional to the joystick movement. The joystick generates a first control signal proportional to movement of the joystick in a first axis and a second control signal proportional to movement of the joystick in a second axis. The servomechanism receives the proportional signal and operates the hydraulic spool valve to cause the lifting arms to raise, lower, grip, or release. This allows the operator to remain in the cabin, while operating the hydraulic valve-controlled lifting arms with proportional control through an electronic control signal. An advantage of the electronic proportional control is to reduce the force to transfer the proportional signal from the vehicle cabin to the rear-mounted hydraulic valve.

The servomechanism can also be operated with a user interface displayed on a display device. The display device may be connected and mounted to the vehicle or may be a mobile device. The display device is operably connected to an encoder, such as through a wireless communication module. The encoder generates the control signal proportional to the user's interaction with the user interface. This allows the user to have remote wireless control of the proportional hydraulic valve.

In addition to electronic control, the lifting arms may also be operated with a manual override. The mechanical linkage may be mounted to a midpoint of the valve handle. This leaves the distal end of the first mechanical linkage accessible for manual operation.

The vehicle-mounted lifting arm controller can also be offered as an add-on kit for existing vehicle-mounted lifting arm controllers that incorporate a hydraulic spool valve. A bracket is provided for mounting the servomechanism to the vehicle frame. The servomechanism is mounted adjacent to the existing hydraulic proportional valve, and the mechanical linkage is used to couple the operation of the servomechanism with the hydraulic spool valve. The control signal generator may be coupled to the servomechanism.

The vehicle-mounted lifting arm controller of this disclosure provides the following benefits: (1) the lifting arms are capable of load holding, which prevents the uninitiated movement of the load; (2) the hydraulic proportional valves and servomechanism may have ruggedness for being mounted to the underside of a vehicle bed; (3) the servomechanism controlled hydraulic proportional valves are capable of quickly stopping a rapidly moving and heavy load; and (4) the proportional control using electronic servomechanism-operated hydraulic valves allows for a wide range of faster and slower movement of the vehicle-mounted lifting arms.

The hydraulic proportional valve may be biased to a neutral position. The servomechanism may overcome that bias, to move the lifting arms, when the servomechanism receives a control signal. This enables the proportional hydraulic valve to return to a neutral position when no signal is received by the electronic servomechanism.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

BRIEF DESCRIPTION OF DRAWINGS

Aspects are illustrated by way of example, and not by way of limitation, in the accompanying drawings, wherein.

DETAILED DESCRIPTION

Figure 1:
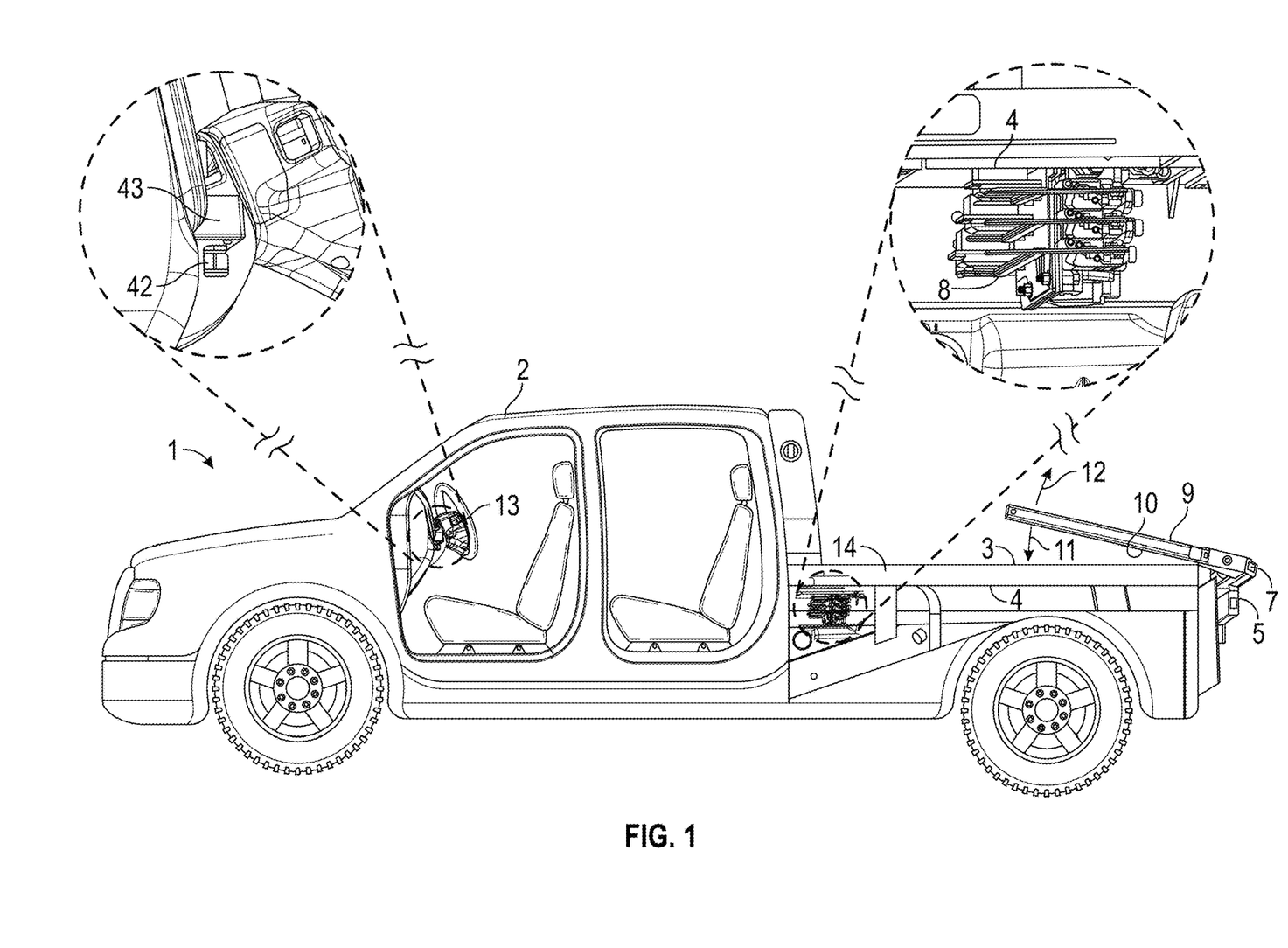
FIG. 1 is a side perspective view of a vehicle-mounted lifting arm controller with a servo valve assembly and a proportional control unit.

A vehicle-mounted lifting arm controller is shown in FIG. 1. The vehicle 1 is shown having a cab 2 and a bed 3. A first lifting arm 9 and a second lifting arm 10 are pivotally mounted to a rear portion 5 of the bed. The lifting arms are shown mounted to a supporting cross bar 7. The cross bar 7 is pivotally coupled to the rear portion 5 of the vehicle's flat bed 3, and the cross bar 7 and gripping arms 9, 10 are shiftable from a stowed position to an operating position by rotating about a transverse axis across the rear end of bed, as indicated on FIG. 1 by arrow 12. The cross bar 7 and gripping arms 9, 10 are shiftable from a stowed position to an operating position by rotating about a transverse axis across the rear end of bed, as indicated on FIG. 1 by arrow 12. The gripping arms 9, 10 are shiftable back to the stowed position from the operating position by rotating about the transverse axis across the rear end of the bed, as indicated on FIG. 1 by arrow 11. In the operating position, the lifting arms extend outwardly from the vehicle in gripping alignment. The gripping arms 9, 10 also move toward and away from one another for gripping and releasing of a bale by rotating about an axis perpendicular to the transverse axis across an end of the cross bar 7.

Figure 4:
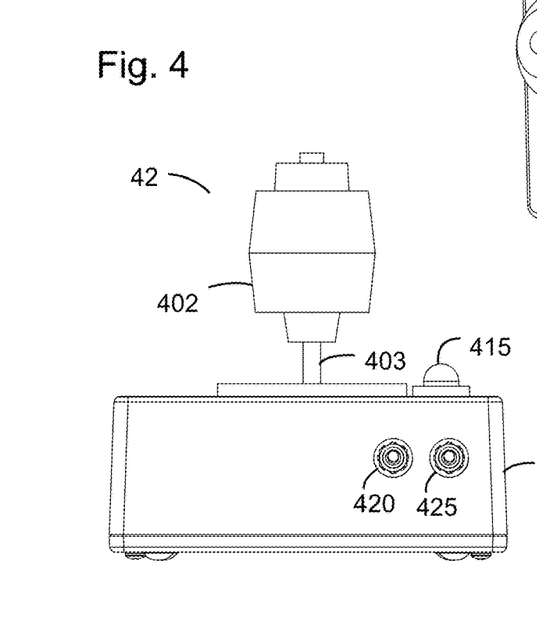
FIG. 4 shows a front view of a physical control device.
Figure 5:
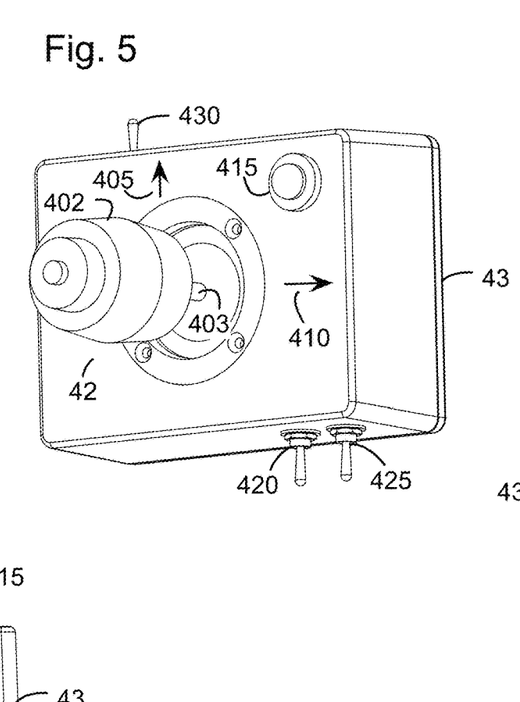
FIG. 5 shows a top perspective view of the physical control device of FIG. 4.
Figure 6:
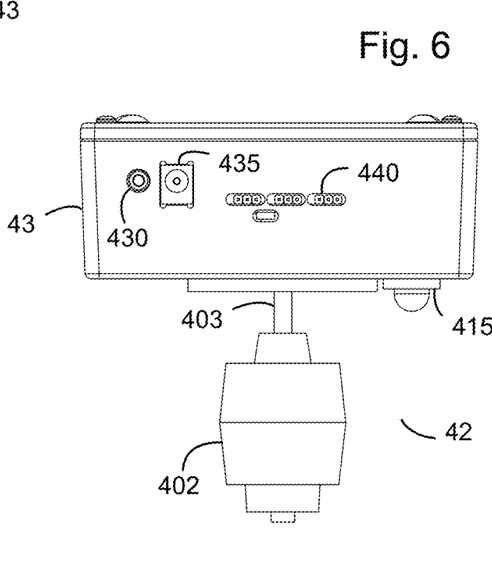
FIG. 6 shows a rear view of the physical control device of FIG. 4.

A physical control device 42 for controlling the movement of the gripping arms 9, 10 may be mounted on the inside of the cab 2, giving the operator easy access to the steering wheel 13 and the physical control device 42. The physical control device 42 is shown in FIGS. 4-6 and described in greater detail below.

In general operation, a control unit 44—such as a potentiometer, or other circuitry capable of monitoring the position of the physical control device 42 and generating a proportional control signal—generates a control signal when the operator moves a physical control device—such as a joystick—in one axis. A control signal is generated by control unit 44 that is proportional to the movement of the physical control device 42 in the one axis. The control unit 44 has a control position sensor—such as a Hall-effect sensor, inductive sensor, optical sensor, or other position sensor capable of giving positional feedback—that proportionally interprets the movement of the physical control device 42 to generate and send a control signal to the corresponding servomechanism 70, 80, 90. The corresponding servomechanism 70, 80, 90 receives the control signal and, in response, rotates to the commanded position. A potentiometer onboard or otherwise operably connected to the servomechanism—or other position sensing device—indicates that the commanded position has been achieved. In one example, a mechanical linkage 72, 82, 92 may connect the servo horn 76, 86, 96 to the valve handle 172, 182, 192, which may be pinned to the valve spool 178, 188, 198. The valve handle is pushed or pulled as the shaft 75, 85, 95 and servo horn 76, 86, 96 is rotated to satisfy the control signal. The valve spool 178, 188, 198 may be proportionally pushed or pulled into or out of the valve body by the valve handle, allowing the operator to have precise control over the speed and direction of movement of the lifting arms. In another example, the servo horn 76, 86, 96 may mechanically link directly to the valve spool 178, 188, 198 to proportionally push or pull the valve spool 178, 188, 198 into or out of the valve body through the mechanical linkage. In another example, the lever arm 76, 86, 96 of the servomechanism 70, 80, 90 may mechanically link directly to the valve handle 172, 182, 192 to proportionally push or pull the valve spool 178, 188, 198 into or out of the valve body through the mechanical linkage. As the valve spool is pulled/pushed, the hydraulic flow is proportionally directed to the corresponding work port 171/179, 181/189, 191/199 of the corresponding hydraulic spool valve 170, 180, 190 and then to the corresponding cylinder or other hydraulic load or output.

A servo valve assembly 8 is shown mounted to hydraulic-capable bed frame 14 below the bed 3 adjacent to an underside surface 4. The servo valve assembly 8 is shown in more detail in FIG. 3 and discussed in greater detail below.

A control unit 44 may also be mounted within box 43. The control unit 44 utilizes a control position sensor to encode the physical movement of the physical control device into a control signal. The control signal is then transmitted to the first servomechanism.

Figure 2:
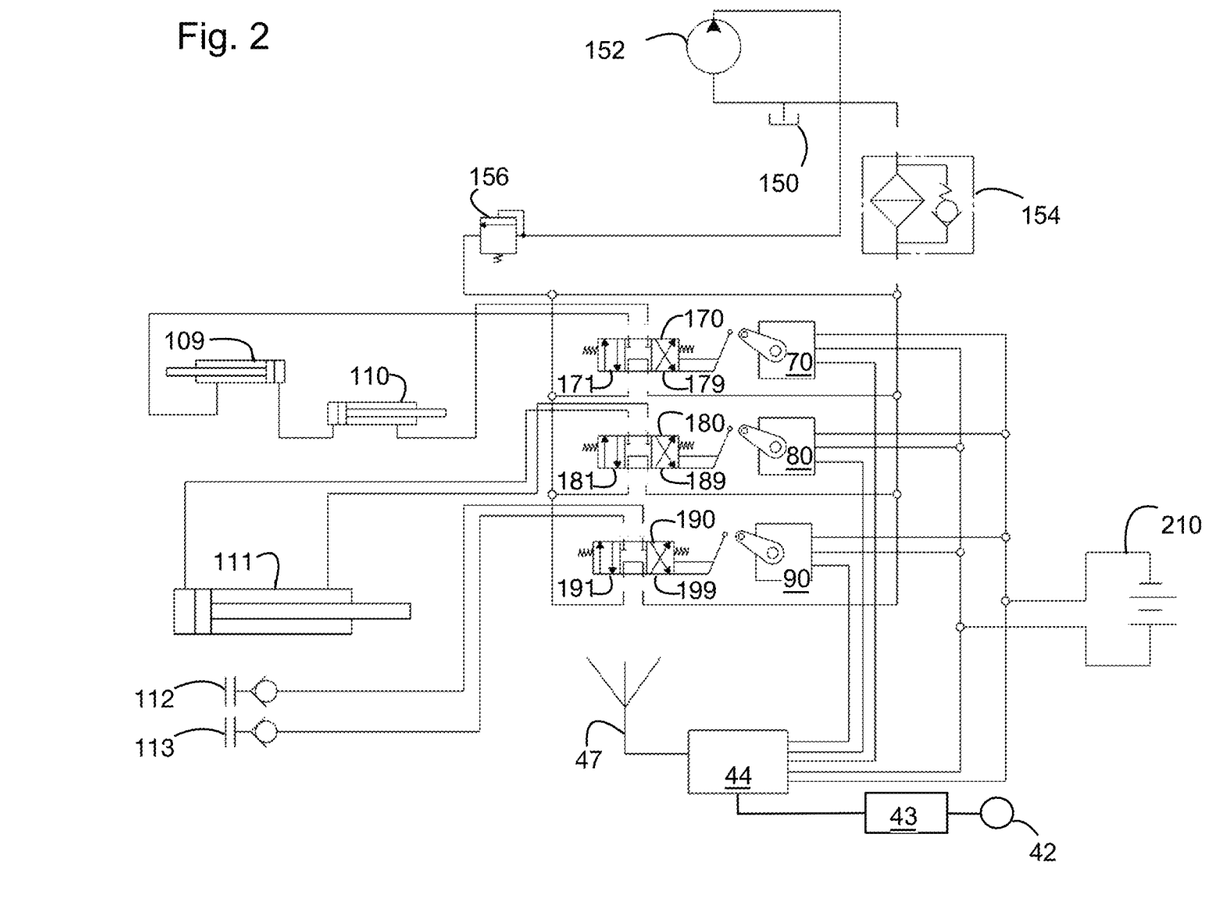
FIG. 2 depicts a servo control schematic showing electrical and hydraulic connections.

As shown in FIG. 2, a first hydraulic circuit controls a first arm cylinder 109 and a second arm cylinder 110, thereby controlling movement of the first lifting arm 9 and a second lifting arm 10 toward and away from one another for gripping and releasing of the bale. The first arm cylinder 109 is operably connected through appropriate linkages to the first lifting arm 9 to control the gripping movement. The second arm cylinder 110 is operably connected through appropriate linkages to the second lifting arm 10 to control the gripping movement of the second lifting arm.

A second hydraulic circuit controls a main cylinder 111, thereby controlling rotation of the lifting arms 9, 10 about a transverse axis across the rear end of bed for loading and unloading. The main cylinder is operably connected by appropriate linkages to the cross bar 7. Additional hydraulic circuits may be provided to operate additional features, such as a driven wheel configured to wind cable about a reel.

Additional hydraulic circuits may be operated by a first auxiliary switch and a second auxiliary switch or additional physical control devices.

A reservoir 150 is fluidly connected to pump 152. The pump may preferably be a fixed displacement pump. A variable displacement pump may also be used. An oil filter head 154 is fluidly connected upstream of the reservoir 150. The pump 152 generates a pressurized flow of hydraulic fluid, which passes is directed and utilized for various work. The system relief valve 156 protects the system from over pressurization. The pressurized flow of hydraulic fluid is available at a first hydraulic spool valve 170 that controls the flow of pressurized hydraulic fluid to the first arm cylinder 109 and the second arm cylinder 110, a second hydraulic spool valve 180 that controls the flow of pressurized hydraulic fluid to main cylinder 111, and a third hydraulic spool valve 190 that controls the flow of pressurized hydraulic fluid to a first third spool quick coupler 112 and a second third spool quick couple 113. The first hydraulic spool valve 170 is controlled by mechanical linkage with a first electronic servomechanism 70. The second hydraulic spool valve 180 is controlled by mechanical linkage with a second electronic servomechanism 80. The third hydraulic spool valve 190 is controlled by mechanical linkage with a third electronic servomechanism 90.

The electric circuit shown in FIG. 2 comprises a battery 210 that is operably connected to provide power to control unit 44. The battery 210 may be the vehicle battery or a supplemental battery or other suitable electric power source. Control unit 44 is operably connected to the first electronic servomechanism 70, the second electronic servomechanism 80, and the third electronic servomechanism 90. The control unit 44 may be operably connected to a wireless communications module 47. The wireless communications module can comprise Bluetooth, RF (radio frequency), IR (infrared radiation), or other wireless control signals.

Figure 3:
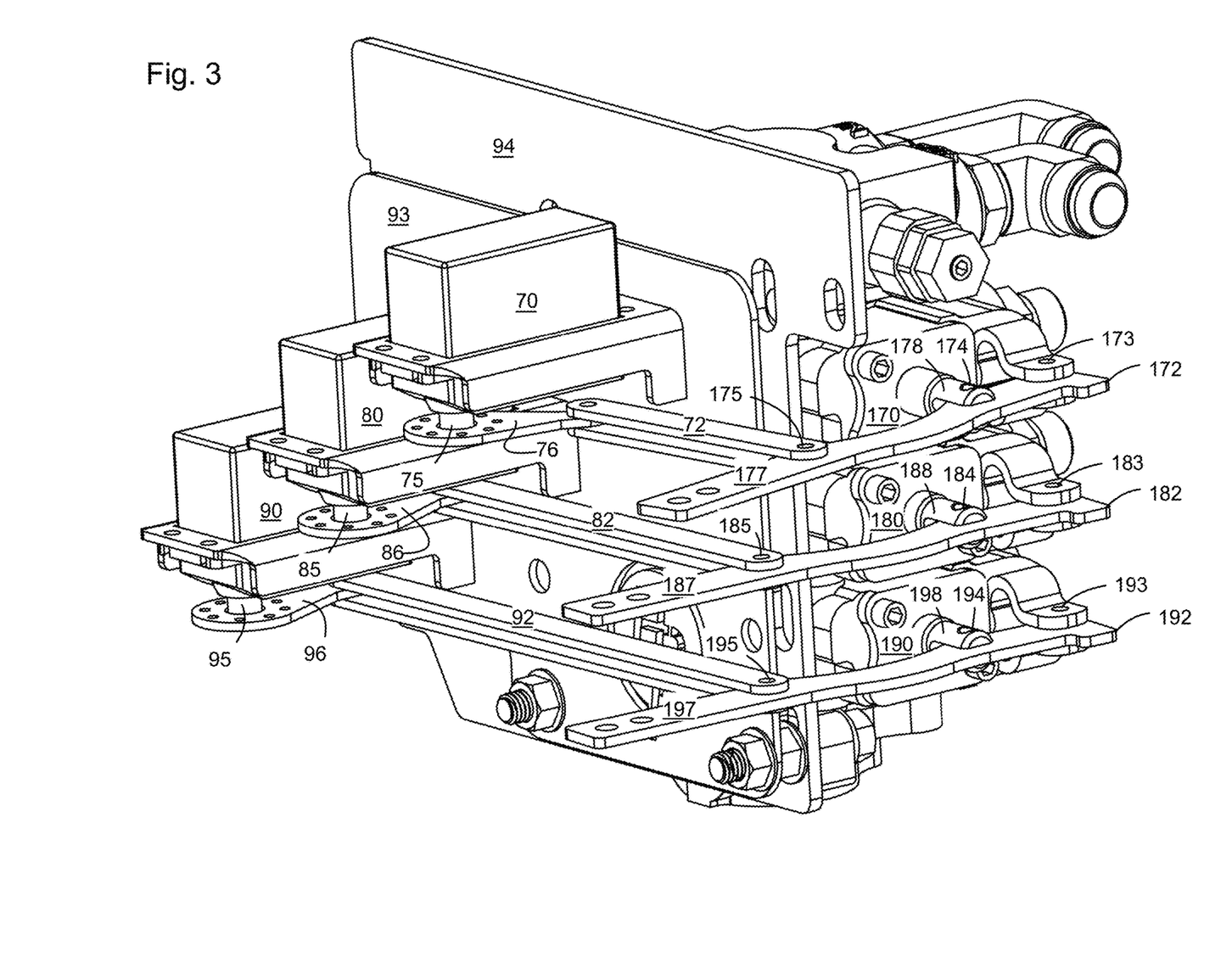
FIG. 3 is a side perspective view of the servo valve assembly.

The servo valve assembly 8 is shown in greater detail in FIG. 3. The first hydraulic spool valve 170, the second hydraulic spool valve 180, and the third hydraulic spool valve 190 may be mounted to a valve bracket 94. The valve bracket 94 may be mounted to the truck frame. The first electronic servomechanism 70, the second electronic servomechanism 80, and the third electronic servomechanism 90 may be mounted to servo bracket 93, which is mounted to the valve bracket 94 or directly to the vehicle frame.

The first hydraulic spool valve 170 has a first valve handle 172. The first valve handle 172 is pivotably mounted to first hydraulic spool valve 170 at pivot point 173. The first valve handle 172 is mounted to the valve stem 178 at position 174. A first mechanical linkage 72 is pivotally mounted to a midpoint 175 of the first valve handle 172. The first valve handle has a distal end 177, that is at the opposite end of the first valve handle 172 from the pivot point 173. The distal end 177 of the first valve handle 172 is accessible for manual operation, providing leverage for easy manual operation. The first mechanical linkage 72 is also pivotally mounted to a first lever arm 76.

The second hydraulic spool valve 180 has a second valve handle 182. The second valve handle 182 is pivotably mounted to second hydraulic spool valve 180 at pivot point 183. The second valve handle 182 is mounted to the valve stem 188 at position 184. A second mechanical linkage 82 is pivotally mounted to a midpoint 185 of the second valve handle 182. The second valve handle has a distal end 187, that is at the opposite end of the second valve handle 182 from the pivot point 183. The distal end 187 of the second valve handle 182 is accessible for manual operation. The second mechanical linkage 82 is also pivotally mounted to a second lever arm 86.

The third hydraulic spool valve 190 has a third valve handle 192. The third valve handle 192 is pivotably mounted to third hydraulic spool valve 190 at pivot point 193. The third valve handle 192 is mounted to the valve stem 198 at position 194. A third mechanical linkage 92 is pivotally mounted to a midpoint 195 of the third valve handle 192. The third valve handle has a distal end 197, that is at the opposite end of the third valve handle 192 from the pivot point 193. The distal end 197 of the third valve handle 192 is accessible for manual operation. The third mechanical linkage 92 is also pivotally mounted to a third lever arm 96.

The output shaft of each servo mechanism may be coupled to a position sensor. For example, the output shaft can be coupled with a position cog that operates a position potentiometer. The position potentiometer generates a reference output position signal that can be received by the control unit 44.

A physical control device 42 is shown in FIG. 4. As illustrated, the physical control device 42 comprises a multi-directional joystick 402 having shaft 403 that extends into the box 43. The physical control device is mounted to box 43 containing a control position sensor configured to generate a first control signal proportional to movement of the physical control device in a first axis shown as arrow 405 in FIG. 5. The control position sensor may also be configured to generate a second signal proportional to movement of the physical control device 42 in a second axis shown as arrow 410 in FIG. 5.

Indicator light 415 is operably connected to the control unit 44 and may be configured to indicate operational status of the lifting arm controls by showing a variety of colors and a series of flashing on-off.

First auxiliary switch 420 and second auxiliary switch 425 are shown mounted to a front surface of box 43. The auxiliary switches may operate power to the control unit or may operate lighting or other auxiliary features.

Reset button 430 is disposed on a back surface of box 43. Reset button 430 allows the user to reset the control unit 44. A power port 435 is configured to connect to a vehicle power source, such as battery 210. Communication port 440 is operably connected to send one or more signals to the first electronic servomechanism 70, the second electronic servomechanism 80, and the third electronic servomechanism 90. Communication port 440 may also be configured to receive a first reference output position signal from the first electronic servomechanism 70, a second reference output position signal from the second electronic servomechanism 80, and a third reference output position signal from the third electronic servomechanism 90.

Figure 7:
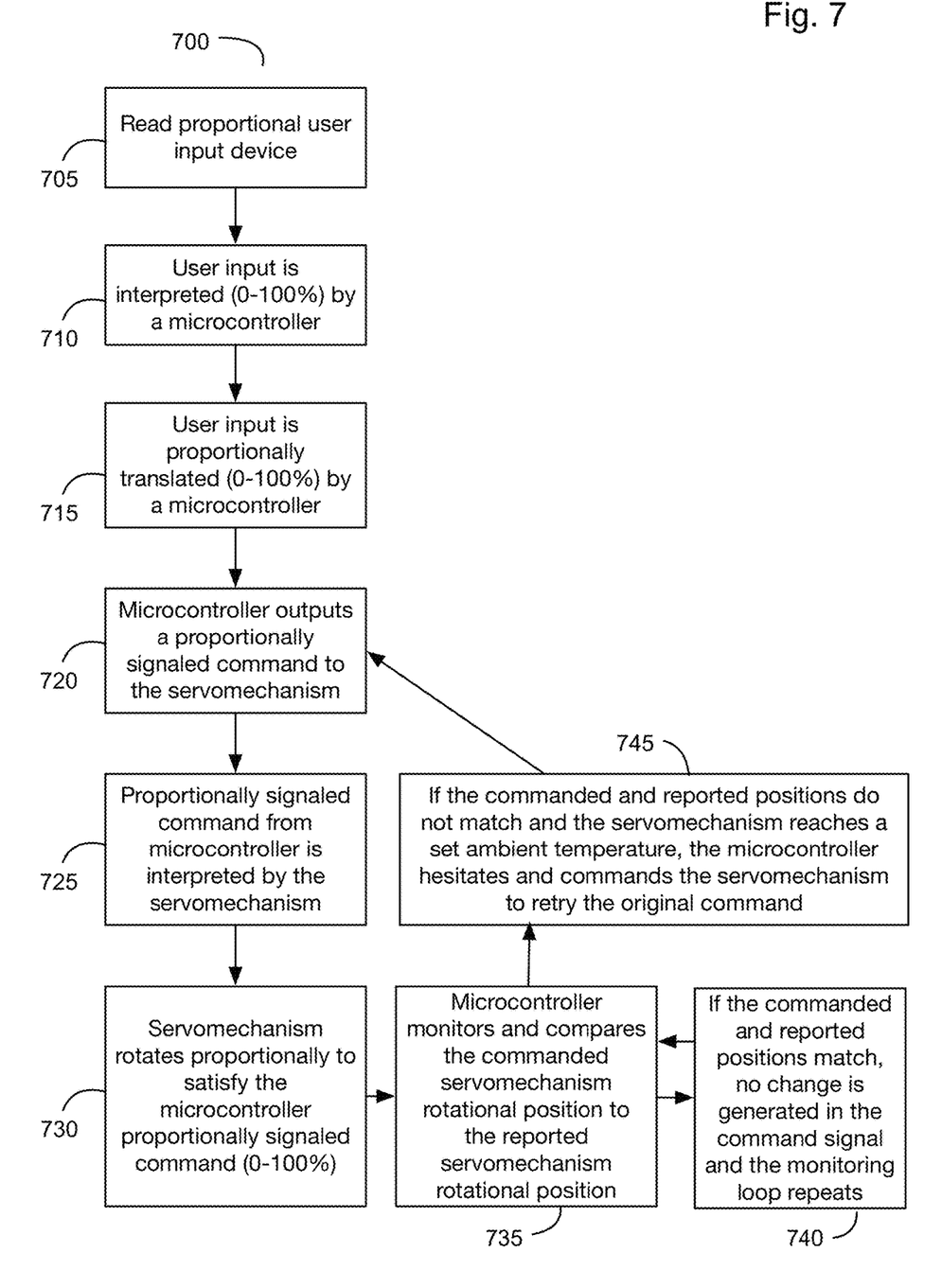
FIG. 7 shows a flow chart for a process for proportionally deploying lifting arms with position feedback.

A control logic process to control the vehicle-mounted lifting arms, process 700, is shown in FIG. 7. The proportional user input device is read, according to step 705. The user input is interpreted (−100%-0-+100%) by a microcontroller, referred to as the control unit 44, as shown in step 710. The user input is proportionally translated (−100%-0-+100%) by the microcontroller, according to step 715. The microcontroller outputs a proportionally signaled command to the servomechanism, according to step 720. The proportionally signaled command, the control command, from the microcontroller is interpreted by the servomechanism, according to step 725. The servomechanism rotates proportionally to satisfy the microcontroller-generated proportionally signaled command (−100%-0-+100%), according to step 730. The microcontroller monitors and compares the commanded servomechanism rotational position with the reported servomechanism rotational position, according to step 735. If the command and reported positions match, no change is generated in the command signal and the monitoring loop repeats, according to step 740. This monitoring process continues as long as the user input is generating a signal. If the commanded and reported positions do not match, and the servomechanism reaches a set ambient temperature, the microcontroller hesitates and commands the servomechanism to retry the original command, according to step 745.

Figure 8:
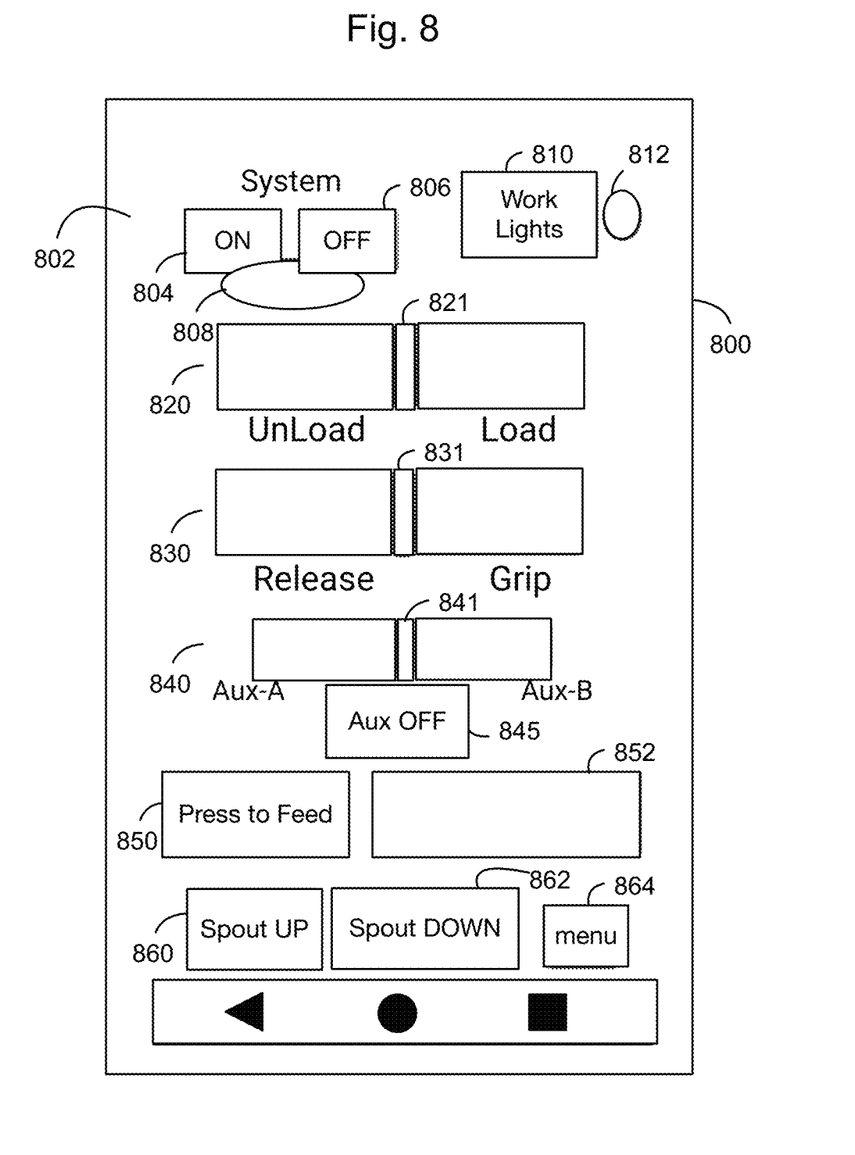
FIG. 8 shows a user interface for proportionally controlling the vehicle-mounted lifting arms.

The control unit 44 may also be controlled through a user interface 802 displayed on a display device 800, as shown in FIG. 8. The user interface 802 is displayed on the display device 800. The control unit 44 is operably connected to the display device 800. This connection may be a physical electric connection or may be a wireless connection to the wireless communications module 47. The wireless communications module can comprise Bluetooth, radio frequency, infrared, or other wireless control signals. The user interface displays an on button 804 to turn power on to the system and an off button 806 to cut power to the system. A virtual status light 808 displays system status. A work light button 810 controls the status of work lights integrated into the vehicle bed area. Work light status indicator 812 changes color to indicate whether the work lights are on or off. Load slider 820 works replicates the function of the physical control device 42 in a first axis. Slider 821 can be moved to the right or left, to generate a control signal proportional to interaction with the distance that the slider 821 moves on the user interface. Moving slider 821 to the right causes a proportional control signal to load the lifting arms. Moving slider 821 to the left causes a proportional control signal to unload the lifting arms. In a similar manner, grip slider 830 works replicates the function of the physical control device 42 in a second axis. Slider 831 can be moved to the right or to the left, to generate a grip control signal proportional to interaction with the distance that the slider 831 moves on the user interface. Moving slider 831 to the right causes a proportional control signal to grip the lifting arms. Moving slider 831 to the left causes a proportional control signal to release the lifting arms. Auxiliary slider 840 controls auxiliary hydraulic circuit through movement of auxiliary slider 841. The user interface displays an auxiliary off button 845 to cut power to the auxiliary hydraulic circuit.

A spout up 860 button and a spout down 862 button operate an electrically powered actuator that raises and lowers a feed spout on the supplemental cake feeder that can be mounted onto the vehicle bed.

A menu button 864 on the display device 800 may be used to switch between context menus of the user interface 802. Additional automated features that may be operated with a button push include: touch & go bale unrolling, automated bale loading, supplemental feeding (HydraFeeder), automated post hole digging. The control unit may be connected to various proximity/motion sensors to prevent operation if unauthorized persons are within a predetermined number of feet of any part of the truck prior to any automated function initiating. If an automated function is in process and any unauthorized person moves within the safety zone, the proximity/motion sensors would signal the controller and the automated function would cease.

Figure 9:
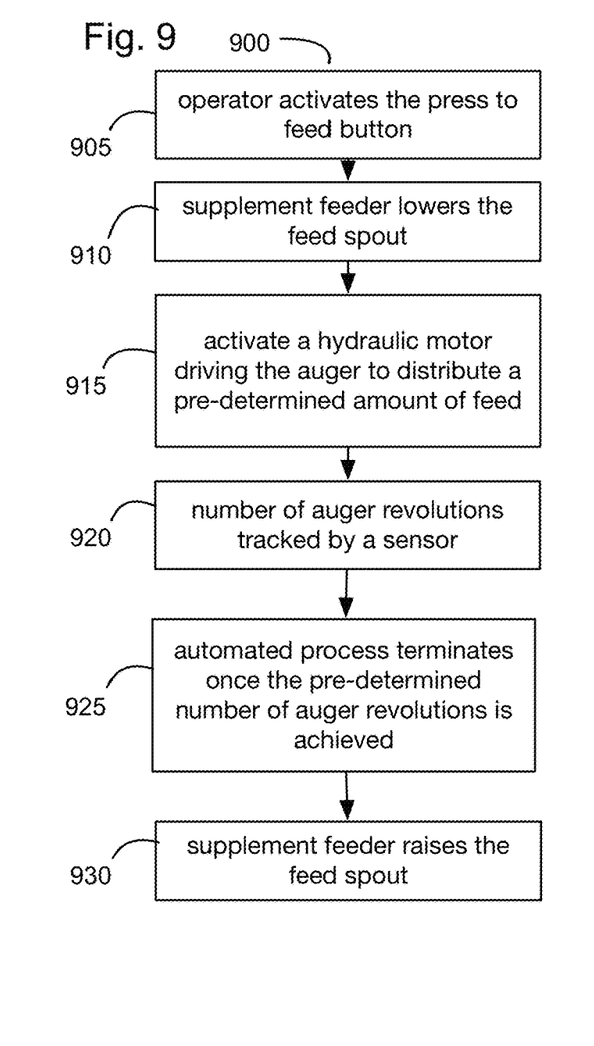
FIG. 9 shows a press to feed process for automatically distributing supplement from a supplement feeder mounted to a vehicle bed.

The press to feed button 850 may initiate a programmed sequence of events of a press to feed process 900, as shown in FIG. 9. For example, a supplement feeder may be mounted to the vehicle bed and operated via the $3^{rd}$ spool auxiliary hydraulics. When the operator activates the press to feed button 850, according to step 905, then the supplement feeder lowers the feed spout, according to step 910. Then the process would send a control signal to activate a hydraulic motor driving the auger to distribute a pre-determined amount of feed, according to step 915. The amount of feed is calculated using a predetermined value for pounds per auger revolution. The number of auger revolutions may be tracked by a sensor, according to step 920, and reported to the control unit or a separate microcontroller which stops the auger once the pre-determined number of auger revolutions is achieved, according to step 925. Lastly, the feed spout is raised, according to step 930. The auger may also be operated using an electric motor, with the control unit in operable communication with the electric motor.

Figure 10:
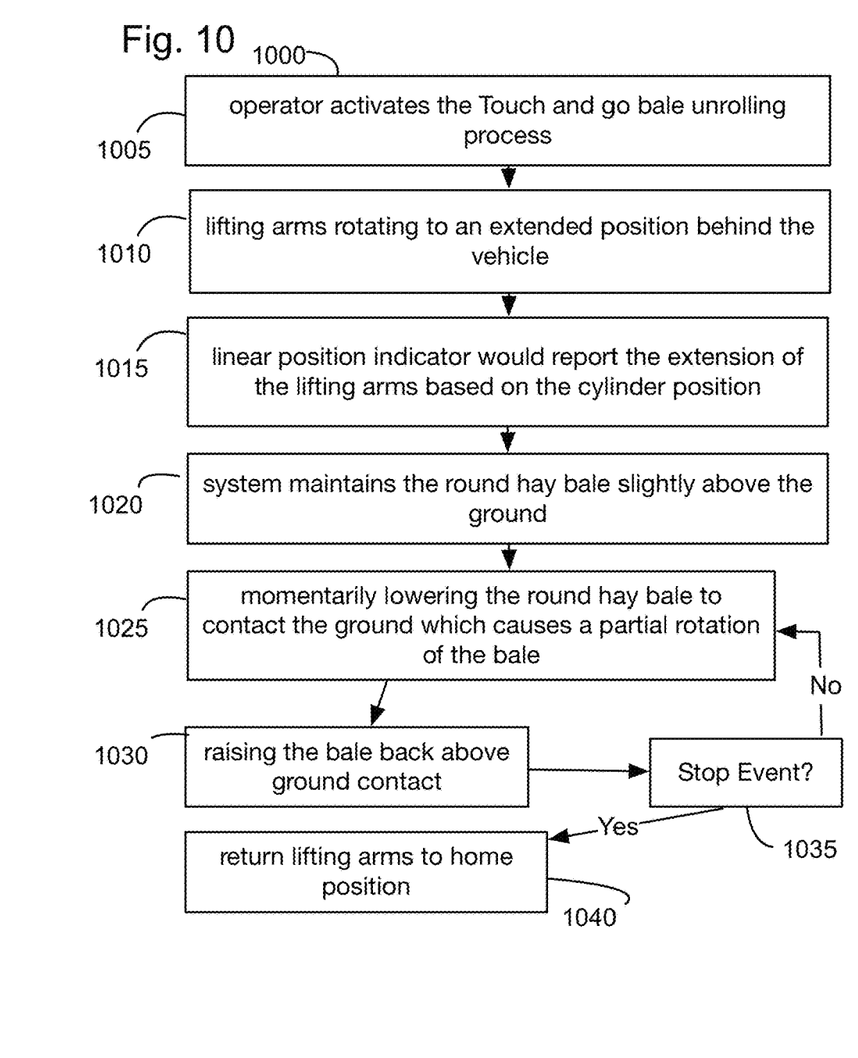
FIG. 10 shows a touch and go bale unrolling process for the automated dispensing of hay from a hay bale.

A touch and go bale unrolling process 1000 is disclosed in FIG. 10. The operator activates the touch and go bale unrolling process 1000, according to step 1005. The lifting arms rotate to an extended position behind the vehicle, according to step 1010. A linear position indicator would report the extension of the lifting arms based on the cylinder position, according to step 1015. The system maintains the round hay bale slightly above the ground, based on position indication on the main lift cylinder, according to step 1020. As the operator drives the vehicle, the system momentarily lowers the round hay bale to contact the ground which causes a partial rotation of the bale and unrolls an amount of hay, according to step 1025. The system raises the bale back above ground contact, according to step 1030. The cycle is repeated at a chosen rate until a stop event, according to step 1035. The chosen rate can depend on the size or weight of the bale, the speed of the vehicle, or other predetermined factors. Stop events include an indication that the bale is unrolled, or after a designated time, or until the operator engages a stop feed button, or upon distribution of a predetermined amount of hay (by weight or by bale radius after indicated by the linear position indicator of step 1015), according to step 1035. If there is no stop event, then the system returns to step 1025. If there is a stop event, then the system returns the lifting arms to the home position, according to step 1040. The system may track the amount of hay dispensed using a loss in weight calculation based on a pressure transducer operably mounted to the main cylinder. The system may also track the amount of hay dispensed using the linear position indicator as an estimate of the remaining hay bale radius. Display 852 may show a timer of how much time of the feed cycle remains or may display the amount of hay by weight remaining on the lifting arms.

Figure 11:
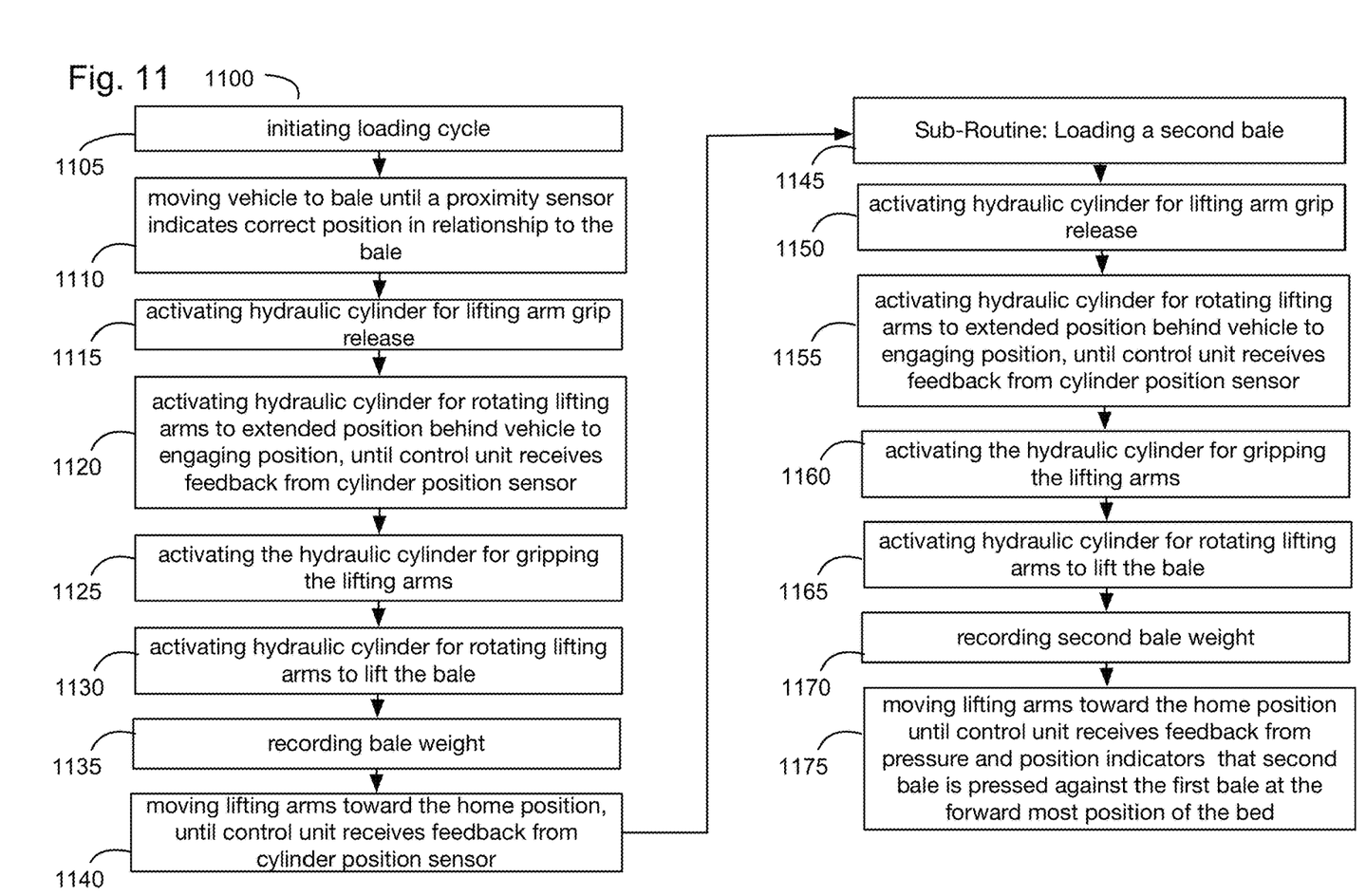
FIG. 11 shows a bale loading process for the automated loading of two hay bales.

An automated bale loading process 1100 is disclosed in FIG. 11. The vehicle is moved into position adjacent to the bale until a proximity sensor indicates correct position in relationship to the bale according to step 1105. The arms move to the grip release position upon activation of the hydraulic circuit, as described above, according to step 1110. The arms move out of home position, rotating to an engaging position where the arms are extended behind vehicle, according to step 1115. The arms continue to rotate until appropriate feedback from cylinder position sensor, according to step 1120. The chosen position for starting the grip process may be when the tips of arms are in the center of the bale. Then the grip function engages, fully gripping the bale, according to step 1125. The hydraulic cylinder for loading activates, thereby raising the bale, according to step 1130. While the bale is suspended, the system may also store the original weight of the hay bale at this time, according to step 1135. The lifting arms rotate until pressure and position indicators confirm that the bale is resting on the bed, according to step 1140. The automated bale loading process 1100 may utilize the proportional controller to proportionally slow down the bale as the bale nears a resting position such as on the bed, the ground, or against an additional bale. As an additional or subroutine, a second bale may be loaded as indicated in step 1145. The vehicle is repositioned adjacent to a second bale. The hydraulic cylinder that controls grip release is activated releasing the grip of the lifting arms on the first bale, according to step 1150. The hydraulic cylinder for rotating the lifting arms to the extended position behind the vehicle is activated, causing the arms to rotate until appropriate feedback from cylinder position sensor, according to step 1155. The chosen position for starting the grip process may be when the tips of arms are in the center of the second bale. Then the grip function engages, fully gripping the bale, according to step 1160. The hydraulic cylinder for loading activates, thereby raising the bale, according to step 1165. While the bale is suspended, the system may also store the original weight of the second hay bale at this time, according to step 1170. The lifting arms rotate until pressure and position indicators confirm that the second bale is pressed against the first bale at the forward most position of the bed, according to step 1175. The first bale is secured to the bed by the pressing force of the lifting arms through the second bale. The proportional controller may be used to proportionally decrease the pressing force as the bale nears a resting position.

Figure 12:
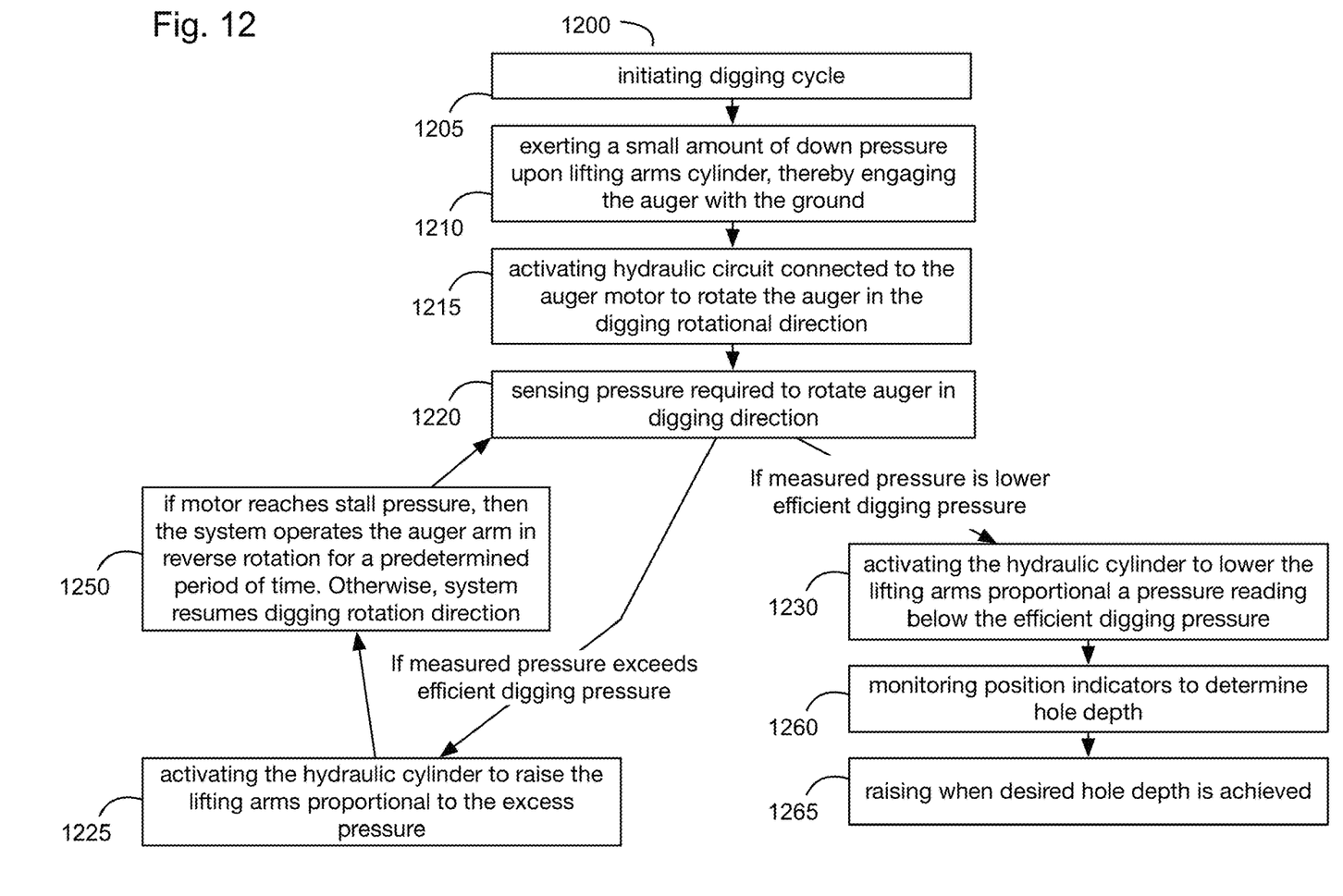
FIG. 12 shows an automated hole digging process for automating the use of a lifting arm-mounted post hole auger.

A post hole digging process 1200 is disclosed in FIG. 12. A hydraulically driven post hole digger (also known as an auger) can be automatically operated using the proportional control system utilizing electronic servomechanism-operated hydraulic valves as disclosed herein. The user positions the vehicle and digger at a chosen hole spot. The user initiates automatic digging cycle, according to step 1205. The control system sends a signal to hydraulically exert an amount of down pressure upon lifting arms cylinder, thereby engaging the auger with the ground, according to step 1210. The hydraulic circuit connected to the auger motor is activated to rotate the auger in the digging rotational direction, according to step 1215. A transducer senses pressure to rotate the auger in a digging direction, according to step 1220. The control unit (or separate microcontroller) raises or lowers the arms to maintain a chosen auger motor pressure reading from the transducer. For example, the user may set the chosen pressure reading to 2,000 psi as an efficient digging pressure. The user may change the efficient digging pressure value depending on the soil, auger, or ambient temperature. If hydraulic pressure resulting from increased digging friction exceeds efficient digging pressure, the control unit activates the hydraulic cylinder to raise the lifting arms proportional to the excess pressure, according to step 1225. If pressure is lower than efficient digging pressure, the control unit activates the hydraulic cylinder to lower the lifting arms proportional to the low pressure reading, according to step 1230. If motor reaches stall pressure, then the system operates the auger arm in reverse for a predetermined period of time, according to step 1250. System resumes digging direction. System monitors position indicators to determine hole depth, according to step 1260. When the hole reaches a chosen depth, the hydraulic cylinder for the auger arms is activated to raise the lifting arms, according to step 1265.

The vehicle-mounted lifting arm controller may also be sold as a kit. The control servo assembly mounted to the servo bracket 93 with appropriate mechanical linkages are provided as a freestanding unit. The control unit 44 may be mounted to the servo bracket 93 as well. The kit is mounted to valve bracket 94 and the corresponding mechanical linkage is mounted to the corresponding hydraulic spool valve 170, 180, 190 of the existing hydraulic control valve system.

The proportional control device may be a joystick as illustrated. Alternatively, the proportional control device may be a physical slider module, a thumbstick, a thumbwheel, a trackball, a display device such as a touch screen smart phone or an accelerometer. The proportional control device may operate in one or more axes. In one example, there are multiple proportional control devices where a corresponding proportional control device controls a corresponding hydraulic circuit. The proportional control device may be mounted anywhere on or around the vehicle or may not be mounted. A physical control device 42 can be wirelessly connected to the control unit 44.

The encoder may also be referred to as the control unit 44. The encoder comprises a circuit board to generate the proportional signal. The control unit 44 may also comprise a potentiometer to generate the proportional signal, such as a pulse width modulation signal between 0-5V. The encoder may comprise a microcontroller such as an Arduino or Raspberry Pi circuit boards. The signal may also be an analog or digital signal configured to operate with a selected servomechanism.

The hydraulic valves are preferably a Husco spool valve with metering notches that is spring returned to a zero-position if no power is driving the servo. Hydraulic spool valves may be advantageous as they provide for load holding, operate in rugged conditions encountered in farming, feeding, and utility work, and stop the movement of rapidly moving heavy loads. The hydraulic valve is operable from −100% to 0 to +100%, where 0 is a neutral position and the plus and minus indirect the two-way function of the valve.

One advantage to using the servomechanism over a solenoid system is that the servomechanism uses a lower current. Alternatively, the servomechanism may be replaced with a linear actuator. The position-based actuator could include a rack and pinion, digital rotary, lead screw, ball screw, or belt drive. The servomechanism is advantageous in that it cooperates with the valve spring to self-center when there is no signal to the servo mechanism. When the valve spring self-centers the valve spool, it can also return the servomechanism to the center/neutral position when the servomechanism is not receiving any power or signal. Another advantage to the servomechanism is that it is waterproof and rugged compared to other actuators.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

We claim:
1. A controller comprising:
 a. a first hydraulic spool valve operably connected to a vehicle-mounted lifting arm;
 b. a first electronic servomechanism;
 c. a first mechanical linkage operably connects the first electronic servomechanism to control the first hydraulic spool valve;
 d. a joystick;
 e. a control position sensor operably connected to the joystick and configured to generate a first proportional signal proportional to a movement of the joystick in a first axis and a second proportional signal proportional to a movement of the joystick in a second axis;
f. a second electronic servomechanism is mechanically connected to a second hydraulic spool valve and configured to control a rotational movement of a first lifting arm about a transverse axis across a rear end of a vehicle bed in response to the second proportional signal; and
g. wherein the first electronic servomechanism is configured to control a movement of the first lifting arm and a second lifting arm toward and away from one another in response to the first proportional signal.

2. The controller of claim 1, wherein the first hydraulic spool valve is nonelectronic.

3. The controller of claim 1, further comprising:
a. a first valve handle that operates the first hydraulic spool valve;
b. a first lever arm that moves upon activation of the first electronic servomechanism; and
c. wherein the first mechanical linkage transfers motion of the first lever arm to the first valve handle.

4. The controller of claim 1,
c. wherein the first electronic servomechanism is configured to proportionally control the first hydraulic spool valve in response to the first proportional signal through the first mechanical linkage.

5. The controller of claim 4, wherein the first electronic servomechanism is configured to receive the first proportional signal.

6. The controller of claim 5, further comprising:
a. a display device;
b. a user interface configured to display on the display device; and
c. an encoder operably connected to the display device and configured to generate the first proportional signal proportional to interaction with the user interface.

7. The controller of claim 1, wherein the first electronic servomechanism adjoins the first hydraulic spool valve.

8. The controller of claim 1, wherein the first electronic servomechanism and the first hydraulic spool valve are mounted to a truck bed.

9. The controller of claim 3, wherein the first hydraulic spool valve is configured to be operated proportionally by the first electronic servomechanism and by manual operation.

10. The controller of claim 9, wherein the first mechanical linkage is mounted to a midpoint of the first valve handle and a distal end of the first valve handle is accessible for manual operation.

11. The controller of claim 3, further comprising:
a. a second valve handle that operates the second hydraulic spool valve;
b. a second lever arm that moves upon activation of the second electronic servomechanism;
c. a second mechanical linkage connecting the second valve handle and the second lever arm; and
d. wherein the second mechanical linkage transfers motion of the second lever arm to the second valve handle.

12. A controller comprising:
a. a first electronic servomechanism configured to operate a vehicle-mounted lifting arm;
b. a first hydraulic spool valve;
c. a first valve handle that operates the first hydraulic spool valve;
d. a first lever arm that moves upon activation of the first electronic servomechanism;
e. a first mechanical linkage operably connects the first electronic servomechanism to control the first hydraulic spool valve, wherein the first mechanical linkage transfers motion of the first lever arm to the first valve handle;
f. a proportional controller that generates a first control signal; and
g. wherein the first electronic servomechanism controls the first hydraulic spool valve through the first mechanical linkage in proportional response to the first control signal.

13. The controller of claim 12, wherein the first hydraulic spool valve is nonelectronic.

14. The controller of claim 12, wherein the first valve handle is pushed by the first mechanical linkage as the first lever arm is rotated in a first direction and the first valve handle is pulled by the first mechanical linkage as the first lever arm is rotated in a second direction.

15. The controller of claim 12, further comprising:
a. wherein the proportional controller is a physical control device;
b. a control position sensor is operably connected to the physical control device and configured to generate the first control signal proportional to movement of the physical control device in a first axis and a second control signal proportional to movement of the physical control device in a second axis;
c. a second electronic servomechanism is mechanically connected to a second hydraulic spool valve and configured to control a rotational movement of a first lifting arm about a transverse axis across a rear end of a vehicle bed in response to the second control signal; and
d. wherein the first electronic servomechanism is configured to control a movement of the first lifting arm and a second lifting arm toward and away from one another in response to the first control signal.

16. The controller of claim 12, further comprising:
a. a display device;
b. a user interface configured to display the proportional controller on the display device;
c. an encoder operably connected to the display device and configured to generate the first control signal proportional to interaction with the proportional controller; and
d. wherein the first electronic servomechanism is configured to control movement of a first lifting arm and a second lifting arm toward and away from one another and a second hydraulic spool valve is configured to control a rotational movement of the first lifting arm about a transverse axis across a rear end of a vehicle bed.

17. The controller of claim 12, further comprising:
a. a bracket; and
b. wherein the first electronic servomechanism is mounted to the bracket, and the bracket is configured to be mounted to a vehicle bed.

18. A method for proportional control of a vehicle-mounted lifting arm comprising the steps of:
a. mechanically linking a first electronic servomechanism to a first hydraulic spool valve operably connected to the vehicle-mounted lifting arm;
b. generating a first proportional signal proportional to a movement of a proportional controller in a first axis and a second proportional signal proportional to a movement of the proportional controller in a second axis using a control position sensor operably connected to the proportional controller;

c. receiving, with the first electronic servomechanism, the first proportional signal, wherein the first electronic servomechanism is configured to control a movement of a first lifting arm and a second lifting arm toward and away from one another in response to the first proportional signal;

d. receiving, with a second electronic servomechanism, the second proportional signal, wherein the second electronic servomechanism mechanically connected to a second hydraulic spool valve is configured to control a rotational movement of the first lifting arm about a transverse axis across a rear end of a vehicle bed in response to the second proportional signal; and e. controlling the vehicle-mounted lifting arm proportionally through mechanical operation of the first hydraulic spool valve by a first mechanical linkage that operably connects the first electronic servomechanism to control the first hydraulic spool valve.

19. The method of claim 18, further comprising the steps of:

a. maintaining the first hydraulic spool valve in a neutral position with a first valve spring;

b. operating a first work port of the first hydraulic spool valve in a first position; and c. operating a second work port of the first hydraulic spool valve in a second position.

20. The method of claim 19, further comprising the step of:

a. operating the first hydraulic spool valve by manual operation of a valve handle.

21. The method of claim 18, wherein the first mechanical linkage operably connects a first lever arm of the first electronic servomechanism to control a first valve handle of the first hydraulic spool valve.

\* \* \* \* \*